(No Model.)

9 Sheets—Sheet 1.

J. DRAHER.
BLANKING OR STUDDING MACHINE.

No. 589,595.  Patented Sept. 7, 1897.

Witnesses
J. G. Hinkel
Vanner D. Stevens

Inventor
John Draher
by Foster Freeman
Attorneys

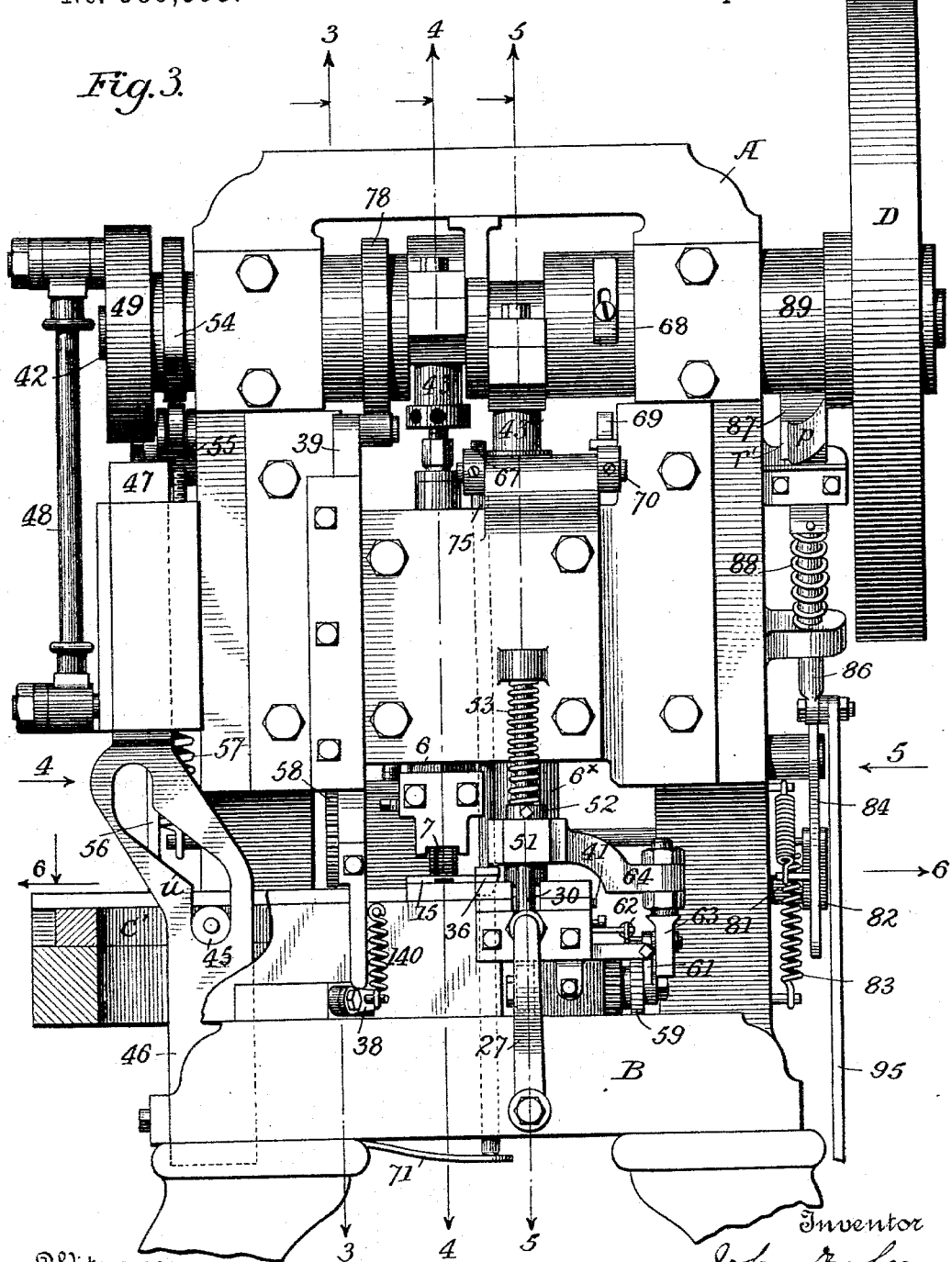

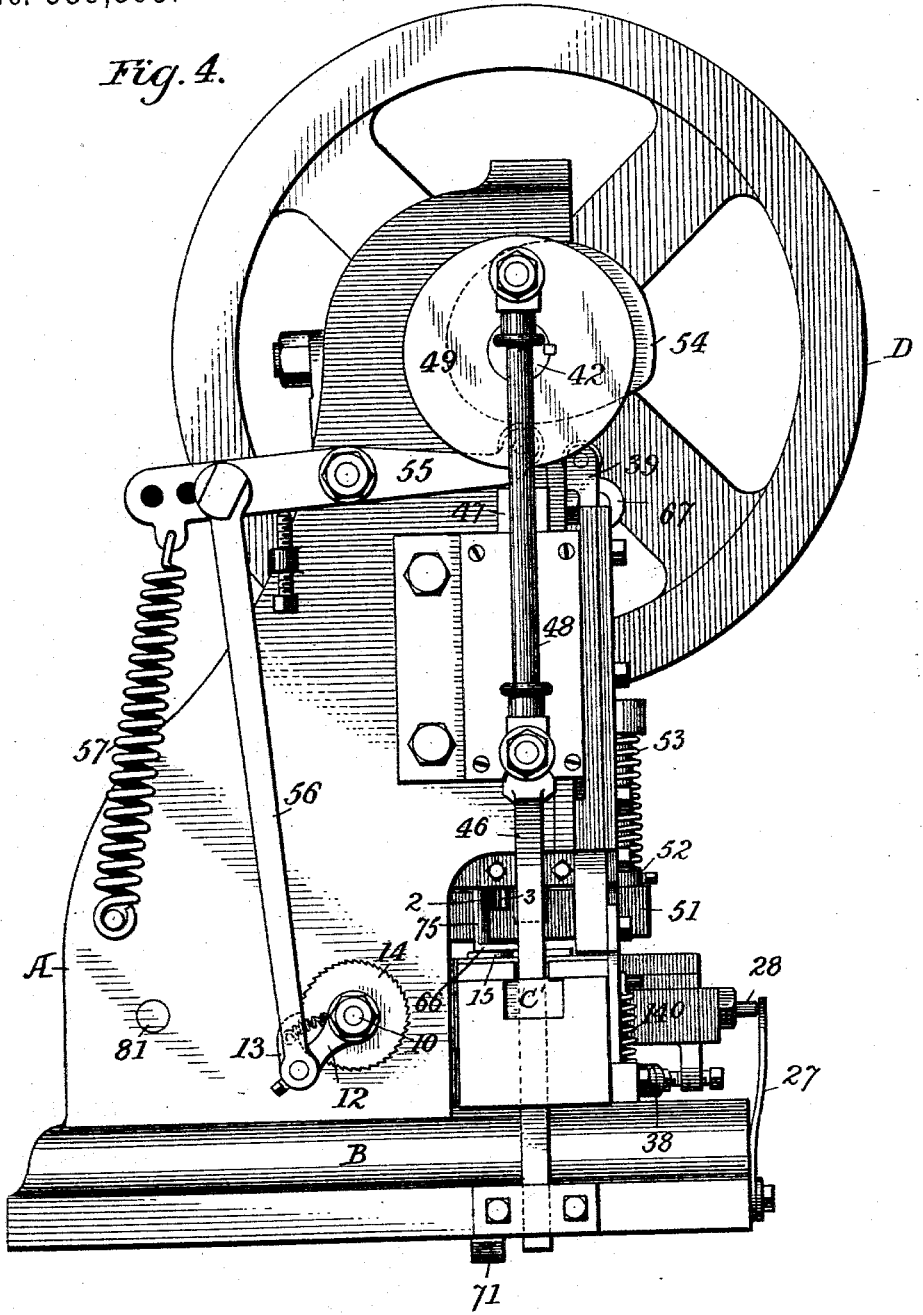

(No Model.)  
9 Sheets—Sheet 4.
J. DRAHER.
BLANKING OR STUDDING MACHINE.
No. 589,595.  
Patented Sept. 7, 1897.
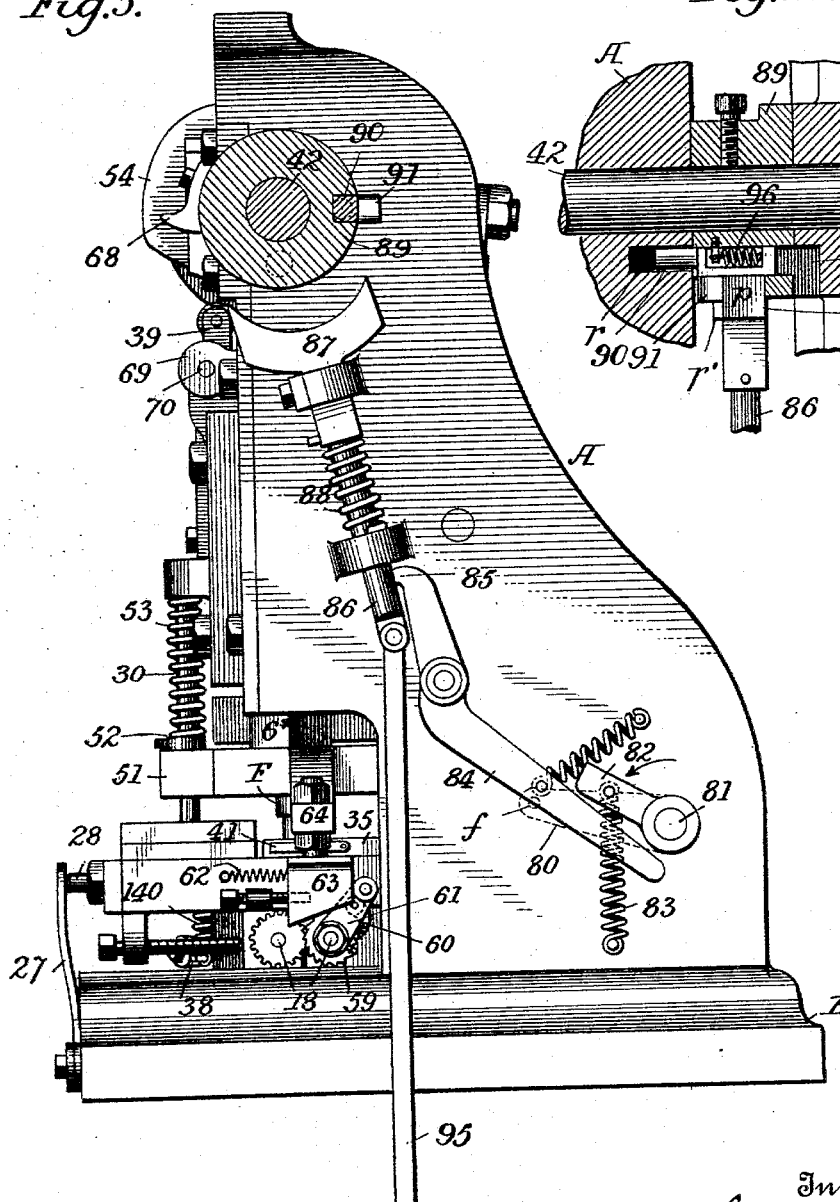
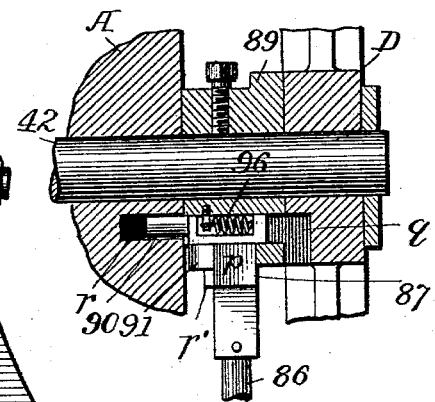
Witnesses  
J. G. Hinkel
Inventor  
John Draher  
by Xavier Freeman  
Attorneys

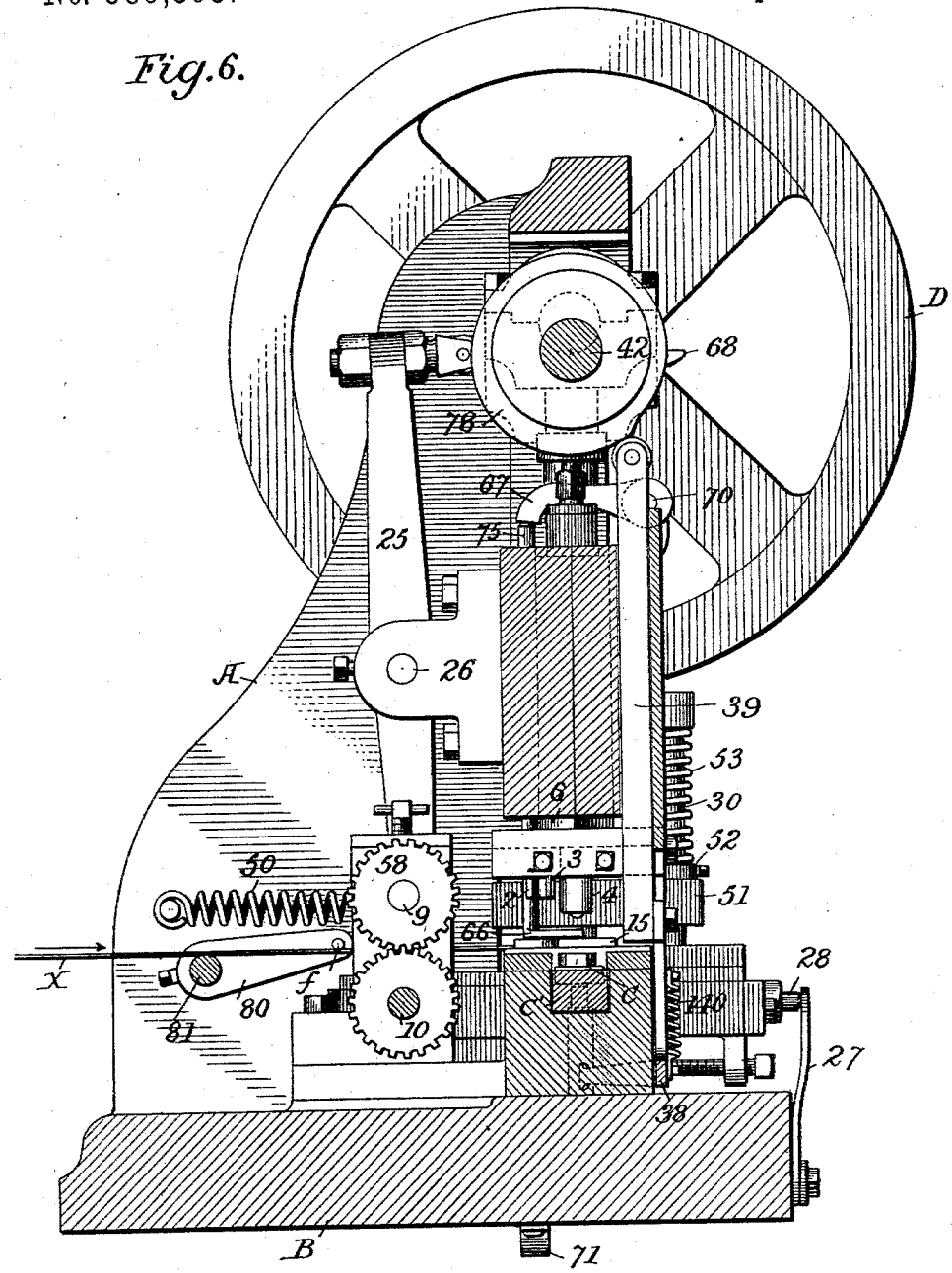

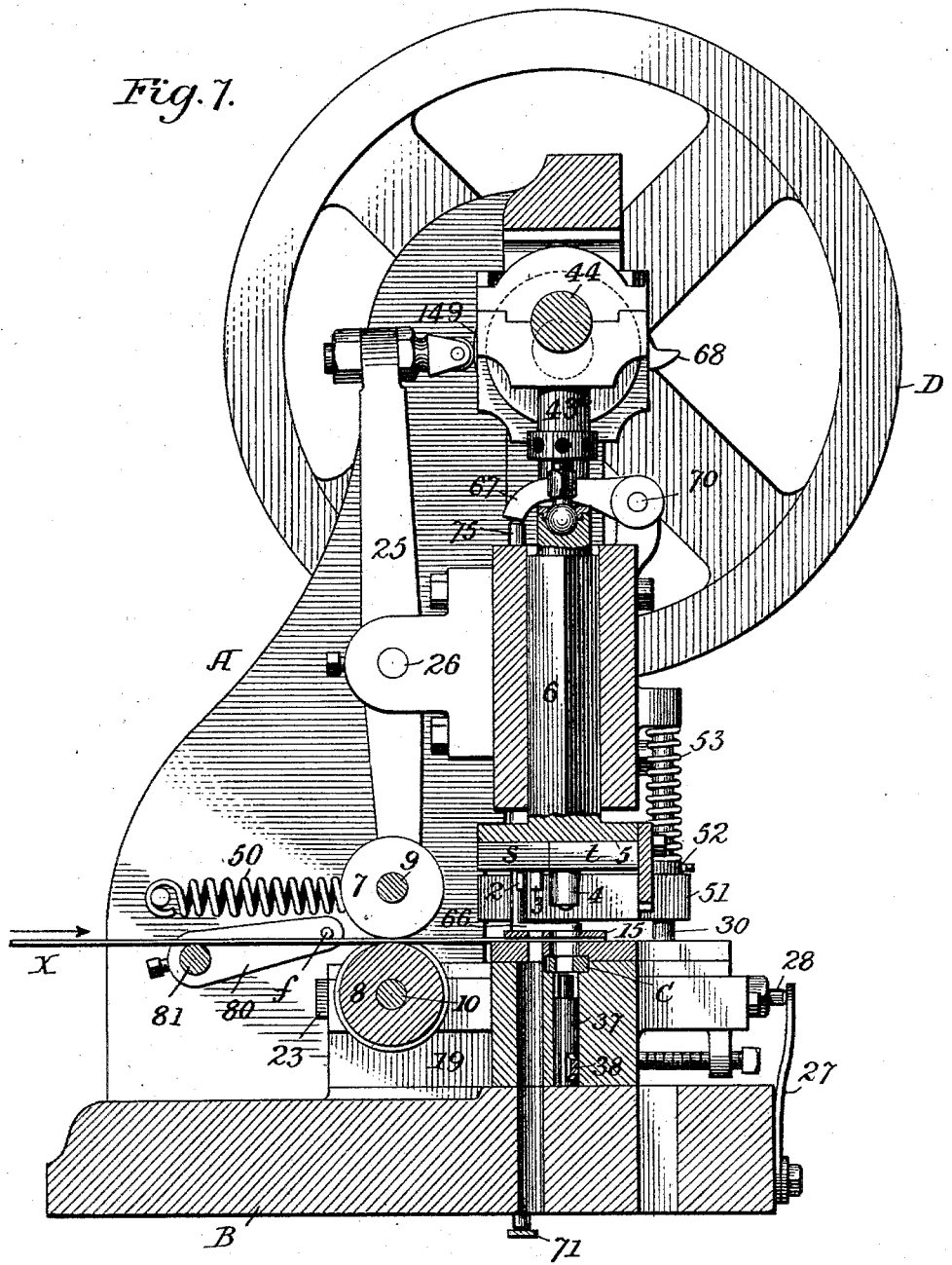

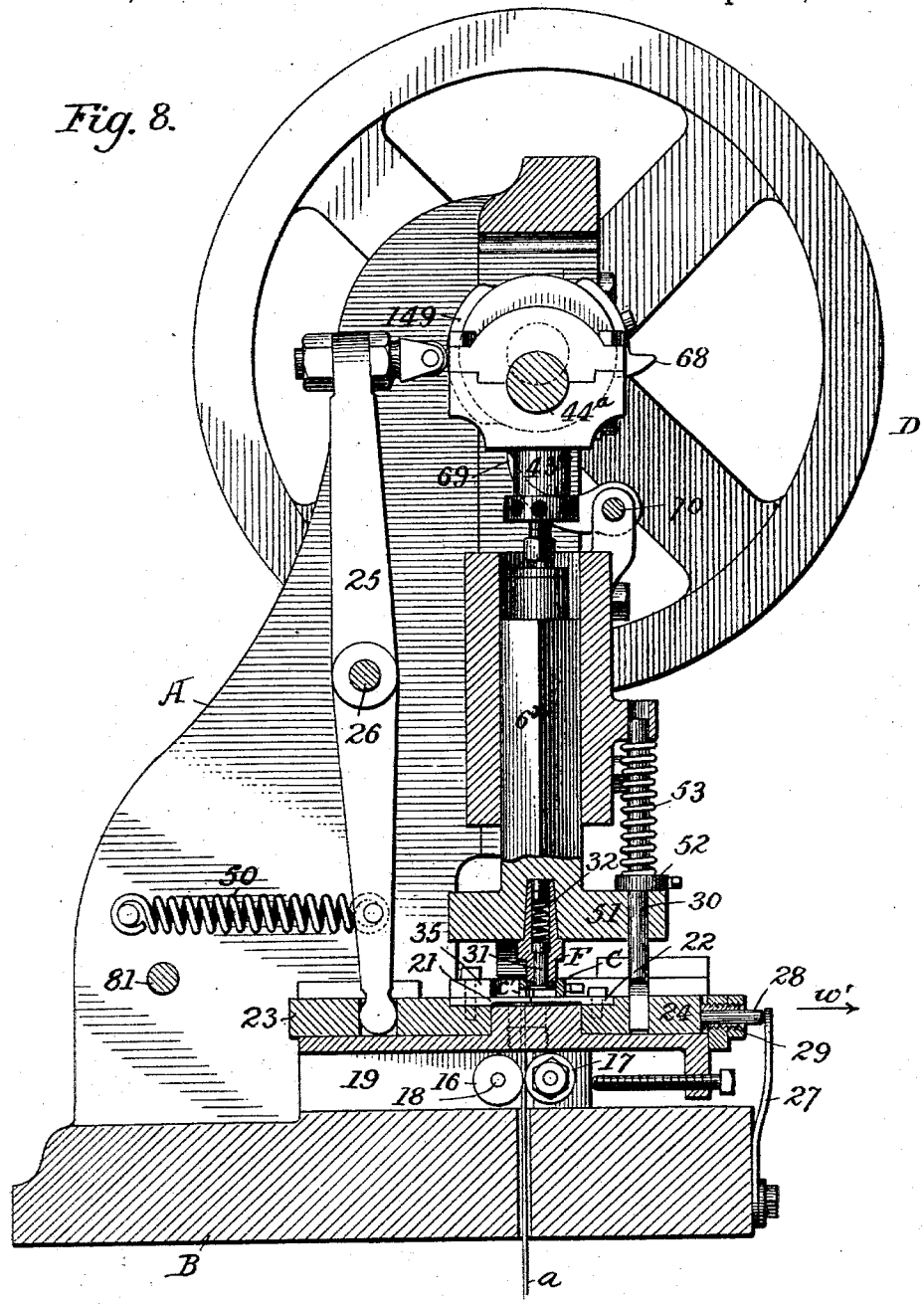

(No Model.) 9 Sheets—Sheet 8.
J. DRAHER.
BLANKING OR STUDDING MACHINE.

No. 589,595. Patented Sept. 7, 1897.

Witnesses
Inventor
John Draher
by Foster & Freeman
Attorneys

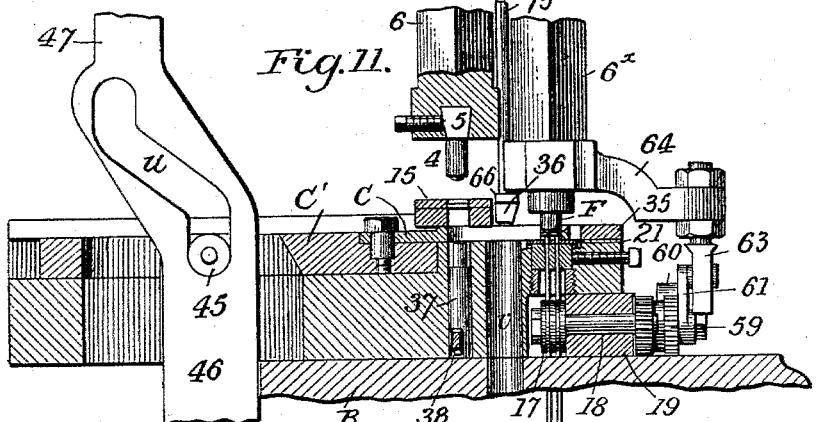

UNITED STATES PATENT OFFICE.

JOHN DRAHER, OF WATERBURY, CONNECTICUT, ASSIGNOR TO THE WARNER BROTHERS COMPANY, OF BRIDGEPORT, CONNECTICUT.

BLANKING OR STUDDING MACHINE.

SPECIFICATION forming part of Letters Patent No. 589,595, dated September 7, 1897.

Application filed February 26, 1897. Serial No. 625,145. (No model.)

*To all whom it may concern:*

Be it known that I, JOHN DRAHER, a citizen of the United States, residing at Waterbury, New Haven county, State of Connecticut, have invented certain new and useful Improvements in Blanking or Studding Machines, of which the following is a specification.

This invention relates to certain new and useful improvements in metal blanking and studding machines; and it has for its object to simplify and increase the efficiency of such machines and to render them wholly automatic in operation. With this object in view the invention consists in means for feeding a metal strip or sheet to punching or perforating devices whereby holes are formed in the strip, of devices for cutting out sections of said strip, and mechanism for inserting sections of wire in the holes of the sections of the strip and for upsetting the wire upon both sides of the severed sections to form studs.

Figure 1:
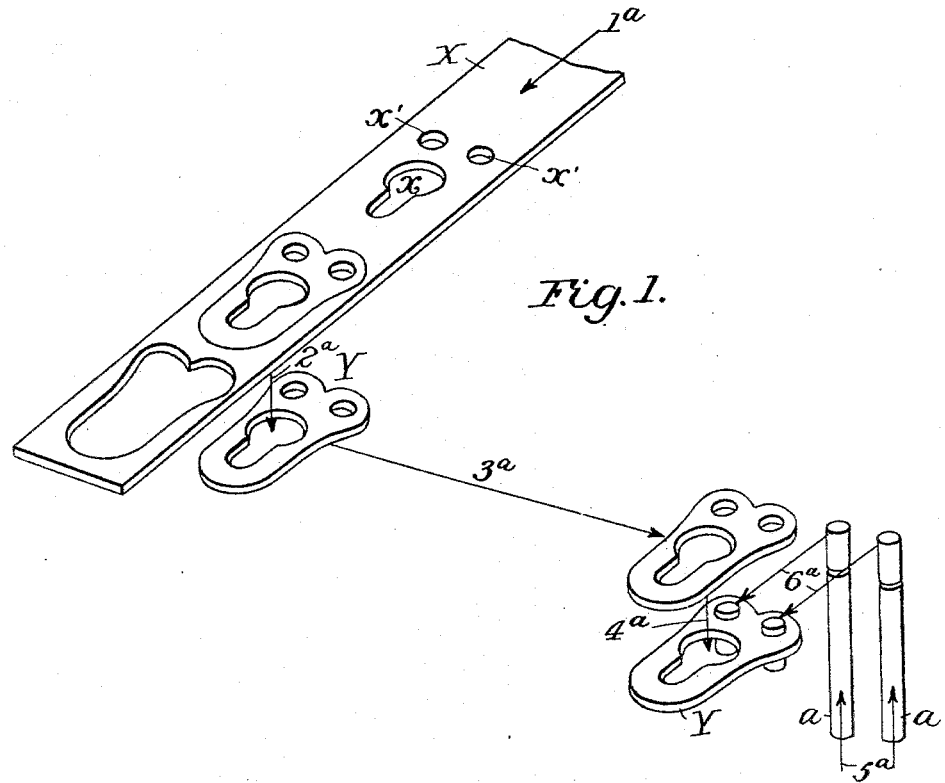
Figure 2:
Figure 9:
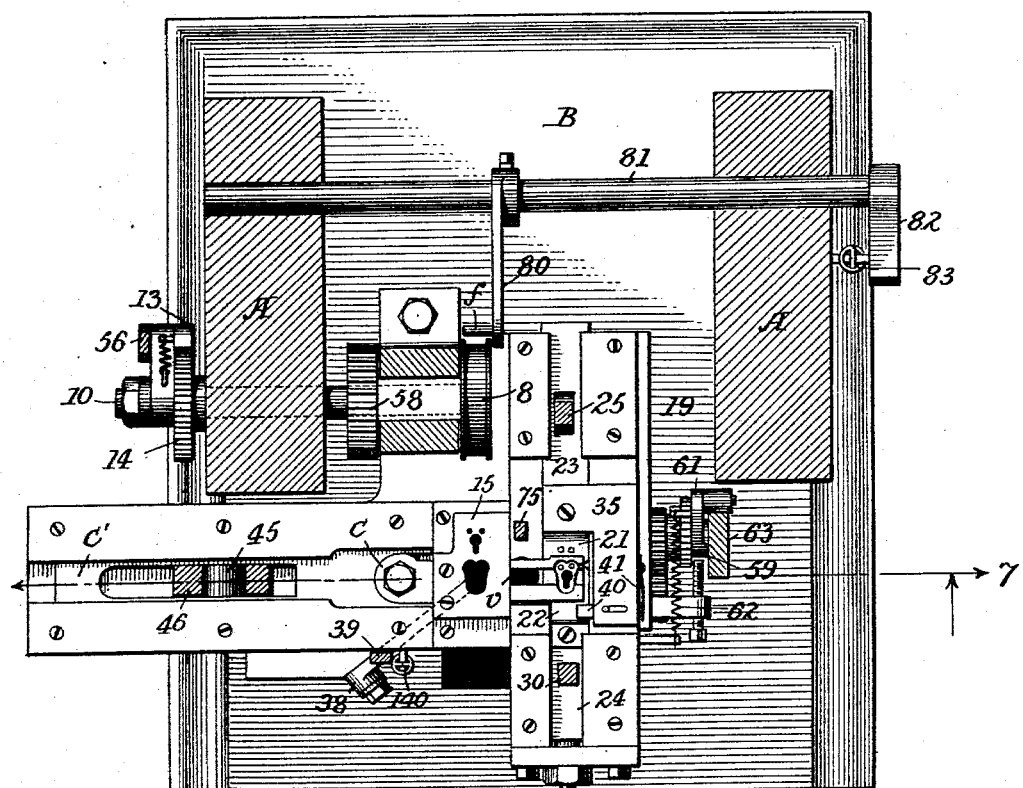
Figure 10:
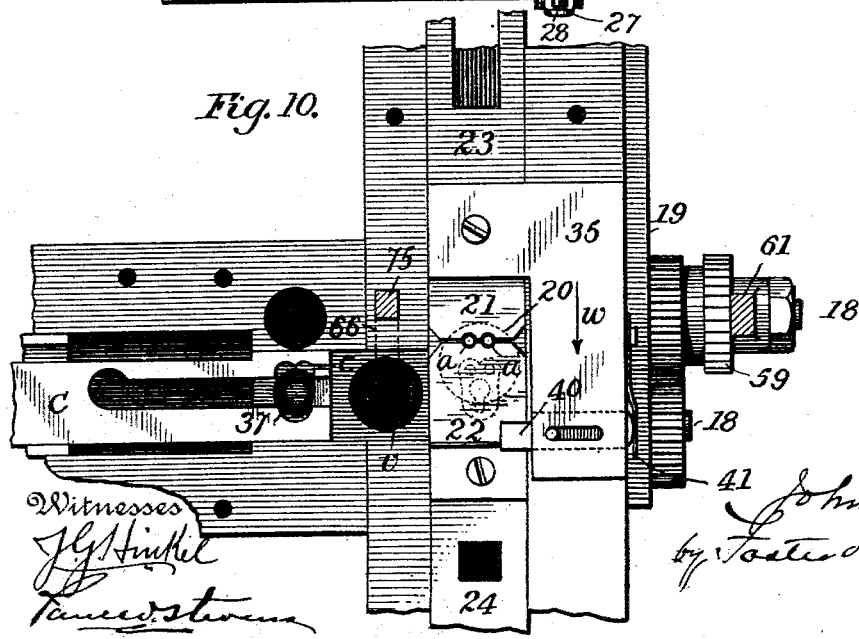

In the accompanying drawings, forming a part of this specification, and in which like letters of reference indicate corresponding parts, Figure 1 is a diagrammatic view illustrating the operation of the invention. Fig. 2 is a perspective view of the article produced by the invention. Fig. 3 is a front elevation of the machine. Figs. 4 and 5 are opposite end elevations of the invention. Figs. 6, 7, and 8 are vertical sectional views on the lines 3 3, 4 4, and 5 5, respectively, of Fig. 3. Fig. 9 is a horizontal sectional view on the line 6 6 of Fig. 3, parts being broken away and in section. Fig. 10 is a similar view, enlarged, parts being removed to show more clearly the blank-carrier and the wire-transferring mechanism. Figs. 11 and 12 are vertical sectional views on the line 7 7 of Fig. 9, showing the blank-carrier and its coöperating parts in different operative positions. Fig. 13 is a detail sectional view of the clutch mechanism of the automatic stop device, and Fig. 14 is an enlarged detail perspective view of the blank-carrier.

Before describing the details of my improved machine I will by reference to Fig. 1 set forth the operation which it is desired to effect.

A strip X, of composition or suitable metal, is fed in the direction of the arrow $1^a$ between punches which operate to form an elongated recess $x$, holes $x'$ $x'$, and to cut out the blank Y. This blank is then transferred in the direction of the arrow $2^a$ to a suitable carrier which moves laterally, as indicated by the arrow $3^a$. During the formation of the blank Y devices are actuating to feed wires $a$ $a$ in the direction of arrow $5^a$, and from the ends of these wires sections are cut. These sections are moved laterally, as in the direction indicated by the arrows $6^a$, to bring their ends in alinement with the holes $x'$ $x'$ of the blank, which has been brought to a plane above the sections. The blank is now moved toward the wire sections, as indicated by arrow $4^a$, and the ends of said sections are received in the holes $x'$ $x'$ thereof. After this suitable heading devices are actuated to upset the sections upon opposite faces of the blank to form studs. By this means there is formed what is known to the trade as a "corset-hook eye," (illustrated in Fig. 2,) but such eye instead of being formed of a plate with openings in it consists of the said plate with a simple opening and with two studs or rivets firmly secured thereto, so that the said eye may be manipulated in attaching it to the steel blade to form a corset-hook without danger of the studs or rivets becoming detached.

It will be evident that the cutters or punches, feeding devices for the strip, blank and wires, and heading devices may be differently constructed and arranged and with different appliances for operating them, but I will now describe one construction and arrangement embodying a machine which has proved to be extremely effective in actual operation.

The frame A of the machine has a base B, upon which is erected the standard or support for the parts which must operate above the base.

There are two punches, one, $s$, having two rods 2 2 and a projection 3, and the other, $t$, having a single projection 4, and both arranged upon a cross-head 5 of a reciprocating plunger 6, the parts 2 2 3 constituting the punch for punching out the openings $x$ $x'$ $x'$, and the projection 4 constituting the punch for punching out the blank, and these two punches are arranged one beyond the other in line with the direction of feeding the strip X, as shown in Figs. 4, 7, 9, and 10. The said strip passes between two feed-rollers 7 and 8 upon shafts 9 10, Fig. 7, and intermittent motion is imparted to the lower shaft 10 by means of a swinging arm 12, carrying a pawl 13, engaging a ratchet 14 on the said shaft 10.

The punches pass through a perforated plate 15, Figs. 7 and 9, which plate is supported in an elevated position to permit the strip X to pass freely below the same, and the punch 4 is longer than the punch 2 3, (see Fig. 7,) so that as the perforated blank Y is punched from the strip it is carried downward and into a carrier-slide C, having an opening adapted to receive the blank (see Figs. 7 and 10) and sliding laterally or in a direction at right angles to the line in which the strip X is fed. The carrier C then moving to the position shown in Fig. 9 brings the blank Y, with its openings $x'$ $x'$, in position to receive the ends of two wires $a$ $a$. In order to insure the retention of the blank in the carrier C, the said carrier is severed at one end, as at $c$, and when the blank is forced into the opening thereof its sides are forced slightly apart and bear frictionally upon the edge of the blank.

The wires pass from suitable reels and are fed upward between a pair of feed-rolls 16 17, Fig. 8, upon shafts 18, turning in a strip 19 upon the bed B, the wires passing from the feed-rollers upward through holes in a die-plate 20, upon the face of which slide two gripper-plates 21 22, connected, respectively, to sliding blocks 23 24. (See Figs. 8 and 10.) The opposing edges of the gripper-plates are notched to receive the ends of the wires $a$ between them, the notches being slightly flared or beveled at their upper ends (see Fig. 1) to upset the pins upon the lower side of the blank, and the said plates are carried first to a position to grip the wires as they rise through the die-plate 20, (see Fig. 10,) and then they are moved together laterally in the direction of the arrow $w$, Fig. 10, thereby shearing off the projecting ends of the wire, forming two pins which are carried to a position beneath the holes $x'$ $x'$ of the blank Y, (see Figs. 8 and 10,) the latter showing in full lines the first position of the gripper-plates in gripping the ends of the wires and in dotted lines the position to which the pins cut from the wires are carried. The carrier C and its contained blank Y are brought into position to receive the ends of the wires $a$ $a$ before the lateral shifting of the wires has been completed, and as the ends of said sections extend above the plane of the lower face of the carrier it is necessary to form recesses $c'$ $c'$ in said face to permit the wires to be moved beneath the blank Y in alinement with its openings $x'$ $x'$.

The block 23, which carries the gripper-plate 21, is reciprocated by a lever 25, oscillating on a pin 26, and the block 24 is moved in one direction by a spring 27, which bears upon a pin 28, sliding in a hollow set-screw block or sleeve 29 and bearing against one end of the block 24. The spring 27 carries the block 24 toward the block 23 and yields to permit the gripper-plate 22 to slide in the direction of the arrow $w'$ when the gripper-plate 21 is moved in that direction, and when the block 24 is in the position shown in Fig. 8, after the pins have been transferred to a position below the blank, the block is held in that position by a lock-bolt 30, which descends into an opening in the block. The pins having thus been brought to proper position, the heading-die F descends. This die is carried upon a plunger $6^\times$, sliding in guides and connected by a rod $43^a$ to a crank $44^a$ of the shaft 42, and has a central plunger 31, which bears against the spring 32 and which by its contact with the blank forces the latter downward to the bottom of the opening in the carrier and onto the gripper-plates 21 22, and then the annular die F, by its contact with the ends of the pins, spreads and heads the latter upon the upper side of the blank and forces a portion of the metal of the studs into the flared ends of the notches of the gripper-plates to form heads upon the opposite side of the blank.

After the pins have been headed and riveted to the blank as aforesaid the carrier C moves back to carry the blank over a discharge-opening $v$, Fig. 11, and a plunger 36 then descends and pushes the blank from the carrier into the opening, through which it drops to a suitable receptacle. Inasmuch, however, as the carrier C cannot move back while the pins are in the recesses in the edge of the plate 22, the carrier C is swung laterally sufficiently to carry the pins out of the recesses. To effect this, a plate 35, bolted to the sliding block 23, (see Figs. 9 and 10,) carries a bolt 40, pushed forward by a spring 41, and which, when the block 23 is carried back after the heading of the pins, makes contact with the edge of the carrier C and swings the latter in a direction to carry the pins out of the notches in the plate 22.

To prevent the blank when it is cut from the strip and carried by the punch $s$ into the the socket in the carrier C from being pushed through the said socket, I provide a sliding gage-pin 37, Fig. 12, which slides in a vertical recess in the bed-plate B below the punch $s$, and which is connected to an arm 38 upon a sliding rod 39, and which is raised into the socket in the carrier as the punch $s$ descends, and thereby gages the position of the blank.

The parts above described are all driven through the medium of any suitable appliances from a driving-shaft 42, rotating in bearings in the frame A and carrying a balance-wheel D. The plungers 6 $6^\times$ slide in suitable guides, and are connected by rods 43 $43^a$ to cranks 44 $44^a$ of the shaft 42, and are thereby reciprocated at the proper times. The carrier C is connected to a slide C', having a roller projection 45, which enters an angular slot $u$ in a plate 46, connected to a bar 47, sliding in suitable guides and connected by a rod 48 with the crank of a crank-wheel 49 upon the shaft 42.

The block 23 is reciprocated by the vibration of the lever 25, which carries a roller that bears upon a cam 49 on the shaft 42, that swings the lever in one direction, while a spring 50 pulls it in the opposite direction.

As stated, the locking pin or bolt 30 locks the block 24 in its position during the heading of the pins when the heading-die F descends. When the heading-die rises, a lug 51, extending from the plunger 6, makes contact with a collar 52 on the bolt 30 and lifts the latter against the stress of a spring 53, which carries the bolt downward when the plunger next descends.

The shafts 9 10 of the feed-wheels 7 8 are geared together by gears 58, Figs. 6 and 9, and the feeding-arm 12, Fig. 4, is reciprocated from a cam 54 on the shaft 42, which bears on the end of a lever 55, connected by a rod 56 to the said arm 12. The cam acts to lift the rod 56, a spring 57 moving the rod in the opposite direction.

The wire-feed wheels 16 17, carried by the shafts 18, are geared together, and upon one of the shafts is a ratchet-wheel 59, with which engages a pawl 60, Fig. 5, upon a rocking arm 61. The arm 61 is carried in one direction by a spring 62, but is vibrated to turn the feed-wheels to lift the wires by the contact of a cam 63, carried by an arm 64, extending from the plunger 6.

The discharge-plunger 36 is upon an arm 66, extending from a rod 75, upon the upper end of which bears the end of a lever 67, which is depressed by a toe 68 on the shaft 42, which makes contact with a horn 69 on a shaft 70, carrying a lever 67. A spring 71, Fig. 3, bears against the lower end of the rod 75 and tends to elevate the same. The slide rod 39, which carries the gage 37, has a roller at the top which engages with a cam 78 on the shaft 42.

If the stock-strip terminates and no material is continued to be fed to the machine, it is desirable to have the latter at once cease its operations. I therefore provide a stop-finger $f$ or other suitable stop-actuating device which bears upon the strip and is held thereby in one position and which moves to another position as soon as the strip passes from the same, and combined with this stop device I employ any suitable appliances which will be operated therefrom to arrest the machine. As shown in Fig. 6, the finger $f$ projects from an arm 80 on a rock-shaft 81, Figs. 5 and 9, and on the end of the shaft 81 is an arm 82, which is drawn by a spring 83 toward one arm of a lever 84, pivoted to the side frame. The opposite arm of the lever has hook 85, which engages a notch in a sliding rod 86, having at the upper end a curved cam 87, which may be thrown by a spring 88 toward a collar 89, secured to the shaft 42. Normally the collar 89 is locked to the band-wheel D by a bolt 90, which slides in the collar and enters a recess $q$ in the band-wheel. When, however, the finger $f$ drops and disengages the hook 85 on the rod 86, the cam 87 is thrown upward, when a pin 91, extending from the bolt 90, will be brought against the beveled end $p$ of the cam 87 and the bolt will be shifted, as shown in Fig. 13, to withdraw it from the band-wheel D, which then turns loosely upon the shaft and the pin 91 strikes a face $r'$ of the cam 87 and at once arrests the further rotation of the shaft. In order to start the machine, the rod 88 may be drawn downward by means of a treadle (not shown) connected to a rod 95, when a spring 96 will force the bolt 90 laterally into the recess in the band-wheel D. The spring 96 should be in the bolt 90.

Without limiting myself to the precise construction and arrangements of parts shown and described, I claim as my invention—

1. In a machine for making articles having projecting pins or rivets, the combination of devices for cutting and perforating blanks and devices for feeding wires, of means for cutting pins from said wires and for carrying the same beneath the perforations in the blanks, means for moving the blanks to insert the pins in the perforations thereof, and a header-die for spreading the ends of the pins to rivet the same to the blank, substantially as set forth.

2. The combination with devices for mechanically feeding a strip X, and for feeding wires and for cutting the wires to form pins, of punches for perforating the strip and cutting blanks therefrom, a carrier for carrying the blanks into position in line with the pins, grippers for engaging and positively gripping the pins, means for carrying them to positions in line with the perforations in the blanks, and means for introducing the pins into the openings in the blanks and for heading the pins, substantially as described.

3. The combination with devices for mechanically feeding a strip and punching devices, of a carrier moving transversely to the direction in which the strip is fed, means for cutting pins from the ends of wires, and grippers for positively gripping and carrying the pins to position opposite the perforations in the blank punched from the strip, and means for inserting the pins in the perforations and for heading the pins, substantially as set forth.

4. The combination with devices for mechanically feeding a strip, punching devices, and carrier C, of means for feeding wires, a cutter for cutting pins from the said wires, and grippers for positively gripping the pins and for carrying the said pins into position below the blank, and heading devices, substantially as set forth.

5. The combination with the devices for mechanically feeding and punching a strip, and the devices for feeding and cutting wires to form pins, of a carrier for the blank, and grippers for positively gripping the pins, and means for operating the carrier and grippers to bring the blank with its openings in line with the pins, substantially as set forth.

6. The combination with strip-feeding devices, of means for perforating the strip and for punching a blank therefrom, devices for transferring the blank to a reciprocating carrier, wire-feeding mechanism, cutting devices for severing sections from the wire and mechanism for feeding the severed sections of wire through the perforations of the strip, and mechanism for upsetting the wire sections upon opposite faces of the blank, substantially as described.

7. The combination with strip-feeding devices, of means for perforating the strip and for punching a blank therefrom, wire-feeding mechanism, means for transferring the perforated blank to bring the holes thereof in alinement with the ends of the wires, means for moving the blank to receive the ends of the wires in its holes, and devices for upsetting the wires upon both faces of the blank, substantially as described.

8. The combination with strip-feeding mechanism, of means for perforating the strip and for punching a blank therefrom, wire-feeding mechanism, devices for moving the blank to receive the ends of the wires in the perforations, means for upsetting the wires upon opposite faces of the blank to form studs and mechanism for automatically discharging the blank and its attached studs, substantially as described.

9. The combination with strip-feeding mechanism, of means for perforating the strip and for punching a blank therefrom, wire-feeding mechanism, devices for transferring sections of the wire in alinement with the perforations of the blank, means for automatically locking said devices when the wire sections have been brought into proper position, mechanism for projecting the ends of the wires through the openings in the blank and devices for upsetting the wire upon opposite faces of the blank, substantially as described.

In testimony whereof I have signed my name to this specification in the presence of two subscribing witnesses.

JOHN DRAHER.

Witnesses:
WILSON H. PIERCE,
J. R. BOOTH.